US008140262B2

(12) United States Patent
Walz et al.

(10) Patent No.: US 8,140,262 B2
(45) Date of Patent: Mar. 20, 2012

(54) METHOD TO IDENTIFY THE VESSEL A CONTAINER IS LOADED ON

(75) Inventors: Thomas Walz, Niefern (DE); Willi Wuensch, Stadecken-Elsheim (DE)

(73) Assignee: International Business Machines Corporation, Armonk, NY (US)

(*) Notice: Subject to any disclaimer, the term of this patent is extended or adjusted under 35 U.S.C. 154(b) by 758 days.

(21) Appl. No.: 11/970,802

(22) Filed: Jan. 8, 2008

(65) Prior Publication Data
US 2009/0177394 A1 Jul. 9, 2009

(51) Int. Cl.
*G01C 3/00* (2006.01)
(52) U.S. Cl. .......... 701/213; 340/988; 340/539.13; 340/539.18; 342/450
(58) Field of Classification Search .......... 701/200, 701/213, 207; 340/10.51, 572.1, 539.26, 340/508, 506, 988, 993, 539.13, 539.18; 702/187; 342/450, 458; *G01C 3/00*
See application file for complete search history.

(56) References Cited

U.S. PATENT DOCUMENTS

| | | | | |
|---|---|---|---|---|
| 6,429,810 B1 * | 8/2002 | De Roche | ............... | 342/357.75 |
| 7,173,530 B2 * | 2/2007 | Lambright et al. | ........ | 340/572.8 |
| 7,323,981 B2 * | 1/2008 | Peel et al. | ............... | 340/539.13 |
| 7,394,363 B1 * | 7/2008 | Ghahramani | ............ | 340/539.22 |
| 7,652,568 B2 * | 1/2010 | Waugh et al. | ............ | 340/538.15 |
| 2006/0152357 A1 * | 7/2006 | Hyde | ..................... | 340/539.13 |
| 2006/0164239 A1 * | 7/2006 | Loda | ..................... | 340/539.22 |
| 2007/0013519 A1 * | 1/2007 | Chung et al. | ............. | 340/572.1 |
| 2007/0040647 A1 * | 2/2007 | Saenz et al. | ............... | 340/3.1 |
| 2007/0115859 A1 * | 5/2007 | Meyers | .................. | 370/254 |
| 2007/0273505 A1 * | 11/2007 | Brosius | ................ | 340/539.13 |
| 2008/0040244 A1 * | 2/2008 | Ricciuti et al. | ............ | 705/28 |
| 2008/0094209 A1 * | 4/2008 | Braun | ..................... | 340/539.13 |

OTHER PUBLICATIONS

Bozzo, R., Derito, A., Nurchi, R., Ackroyd, N., "MOCONT: a new system for container terminal monitoring and control", Publication Year: 2001, pp. 1090-1094.*
Pu Yunming, Jiang Jingui, Lin Yicong, "Searching Algorithm of Container Monitoring Based on RFID", Publication Year: 2007, pp. 453-456.*
Environmental Studies, "GPS Vessel Tracking/GPS Marine Tracking Systems", http://www.environmental-studies.de/GPS/GPS-tracking-systems/Marine-Tracking/marine-tracking.html, 2007, 3 Pages.
Quick et al., "Tracking Marine Containers for Homeland Security", http://www.deskeng.com/Articles/Applications/ Tracking-Marine-Containers-for-Homeland-Security-200606191087.html, Desktop Engineering, Jun. 1, 2006, 4 Pages.
Tubb, F. "Customer Solutions: Creating a Secure and Efficient Marine Asset Tag Tracking Systems with MATRIXx", http://sine.ni.com/csol/cds/item/vw/p/id/658/nid/124400, National Instruments Corporation, 2007, 3 Pages.
Gambon, J., "RFID Contains Solution to Chinese Shipping Problems", RFID Journal, Nov. 6, 2006, 7 Pages.
"Tideworks Technology Chooses Vivato for Cost-Effective Wireless Solution at the Port of Seattle", http://www.businesswire.com/news/home/20040329005289/en/Tideworks-Technology-Chooses-Vivato-Cost-Effective-Wireless-Solution, Business Wire, Mar. 29, 2004.

* cited by examiner

*Primary Examiner* — Tuan C. To
(74) *Attorney, Agent, or Firm* — Sawyer Law Group, P.C.

(57) ABSTRACT

A method and system for determining which vessel a container is loaded on. Independent location information received from the container and a vessel is compared to determine a distance between the vessel and the container. If the distance is within the length of the vessel, the container is loaded on the vessel.

8 Claims, 4 Drawing Sheets

METHOD TO IDENTIFY THE VESSEL A CONTAINER IS LOADED ON

BACKGROUND OF THE INVENTION

1. Field of the Invention

The present invention relates generally to container tracking, and more particularly, to identifying a particular vessel on which a container is loaded.

2. Description of Related Art

Costs from misplaced and stolen cargo are a large expense for shippers and manufacturers. For example cargo can be mixed up in a shipping yard loaded on an incorrect vessel and have to be sent back on a return trip. In another example, cargo can be stolen from a shipping yard while being manually marked as loaded on a vessel.

The advent of GPS (Geographical Positioning Systems) systems provide location information that can be used to track vessels. An AIS (Automated Identification System) system can check location information of a vessel against an intended route to make sure the vessel is on course. Also, the AIS system can aid in navigation and help prevent collisions with nearby vessels. Problematically, the AIS system provides information about the vessel in real time, but not information about the cargo itself.

Typically, the cargo is scanned at a shipping yard when loaded sent, received, and unloaded. Thus, there are blind spots between scans. Additionally, scanning information is traditionally provided by the shipper, a secondary and possibly unreliable source.

Therefore, what is needed is to determine which vessel a container is loaded on. The determination can compare location information received from the container and compared against location information received from the vessel.

SUMMARY OF THE INVENTION

A method and system for determining which vessel a container is loaded on. Independent location information received from the container and a vessel is compared to determine a distance between the vessel and the container. If the distance is within the length of the vessel, the container is loaded on the vessel.

In one embodiment, information identifying one or more containers is received. Container location information from a container tracking system is received. The container location information indicates a location of one or more containers. The vessel information is received from a vessel information system (e.g., an AIS or Automated Identification System). The vessel information indicates an identity and a location for one or more vessels. The container location is matched to the vessel location to determine that a container is loaded on a particular vessel. In one embodiment, the matching is performed by a centralized system, and in another embodiment, the matching is performed locally by a container itself.

BRIEF DESCRIPTION OF DRAWINGS

The accompanying drawings illustrate several embodiments of the invention and, together with the description, serve to explain the principles of the invention. One skilled in the art will recognize that the particular embodiments illustrated in the drawings are merely exemplary, and are not intended to limit the scope of the present invention.

DETAILED DESCRIPTION OF PREFERRED EMBODIMENTS

Figure 1A:
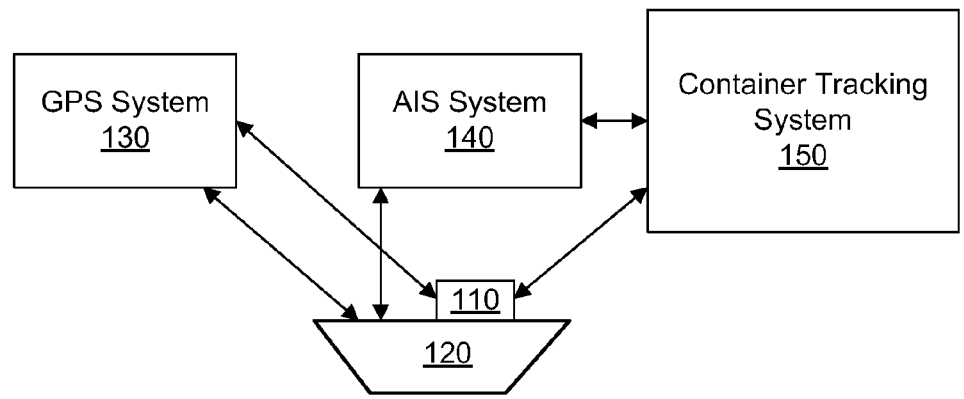
FIGS. 1A,B are block diagrams illustrating system for identifying a vessel a container is located on, according to some embodiments of the present invention.

The present invention relates generally to container tracking and container status. In particular, a vessel upon which a container is loaded can be determined. As a result, misplaced or stolen freight can be quickly identified, thereby saving money and time. The description below is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein. For example, one of ordinary skill in the art will understand that the teachings herein are adaptable to determining whether a container is stored in a correct shipping yard or warehouse, or whether a container is loaded on a correct airplane FIG. 1A is a block diagram illustrating an identification system 100 for identifying a vessel that a container is loaded on, according to one embodiment of the present invention. Identification system 100 comprises a container 110, a vessel 120, a GPS (Global Positioning System) system 130, an AIS (Automated Identification System) system 140, and a container tracking system 150. In one embodiment, the identification system 100 can determine that the container 110 is loaded on the vessel 120 as planned, or in the alternative, that the container 110 has been misplaced. The determination can be performed automatically and in real time. Although FIG. 1 and the related description refers to a single container and a single vessel for the purpose of illustration, it will be understood by those of ordinary skill in the art that the identification system 100 is configurable to track multiple containers and multiple vessels traveling over different routes.

The container 110 can be packaged freight or any other type of object suitable for shipping. For example, an article of manufacture can be packaged for shipping in a carton, several cartons can be combined in a box, several boxes can be stacked on a pallet, and several pallets can be loaded in a trucking compartment. Thus, the container 110 can refer to any of these objects. The container 110 further includes a communication device which can be coupled to the container 110 or integrated within. Examples communication devices include one or more transponders, and a satellite telephone. A transponder (e.g., a GPS transponder) can transmit radio signals to a receiver. A satellite telephone can be used to communicate via SMS (Short Message Service) messages. The container 110 communicates with the GPS system 130 (or any other location system), to determine a current location. The container 110 communicates with the container tracking system 150 to send container location information.

The vessel 120 can be a freight ship that docks at shipping ports to carry the container 110 and other objects. In other embodiments, the vessel 120 can be a train or train car, a truck or trucking compartment, an airplane or airplane cargo space, or any other transport device. The vessel 120 can further include one or more transponders, or other types of communication devices (e.g., a GPS transponder and/or an AIS transponder). The vessel 120 also communicates with the GPS system 130 to determine a current location. Additionally, the vessel 130 communicates with the AIS system 140 to report location information along with other data such as heading, speed, direction, and the like.

The GPS system 130 can be the worldwide system operated by the US Department of Defense, or any other location system. In one embodiment, the GPS system 130 includes twenty-four satellites that transmit synchronized codes to GPS receivers on the ground. The GPS receivers use the codes, and a time of arrival, of several satellites to determine a location. In other embodiments, location can be determined by a private system, by mobile telephones, or the like.

The AIS system 140 can be, for example, a maritime tracking system composed of a combination of hardware and software, to locate and track ships via a screen or chart plotter. As a result, ship navigators can prevent collisions, estimate arrivals, and chart around rough weather. The AIS system 140 can receive signals from vessel transponders sent at regular intervals. Receivers in the AIS system 140 can be located on other ships or land-based towers. The AIS system 140 is in communication with the container tracking system 150 (e.g., via the Internet) to share the vessel information.

The container tracking system 150 can be a worldwide or localized system used to track the container 110 as it travels from a departure location to an arrival location. Coverage of the container tracking system 150 can encompass an entire travel route, or just a portion thereof, such as just a sea-borne portion. The container tracking system 150 receives location information from the container 110 and location information related to the vessel 120 from the AIS system 140. In one embodiment, the vessel location information can be received directly from the vessel 120. The two independent sources of information are compared to determine whether a container is on a vessel. The container tracking system 150 can be implemented by a combination of hardware (e.g., processor based computer device) and software. The container tracking system 150 is shown in further detail with respect to FIG. 2.

Figure 1B:
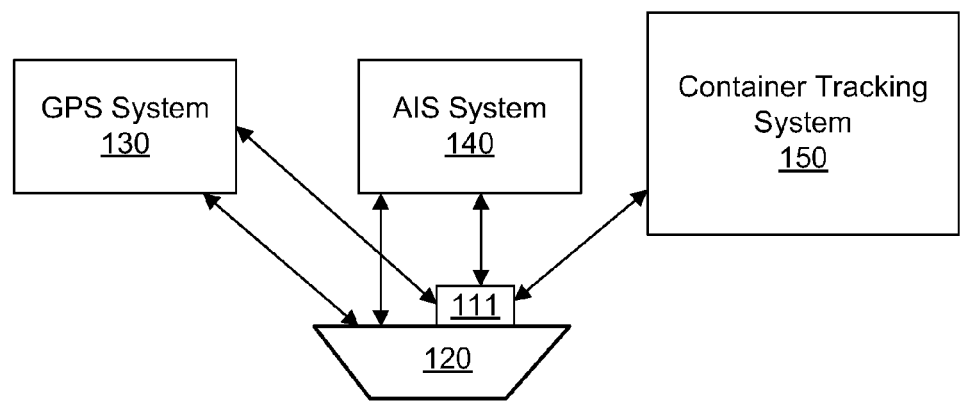

FIG. 1B is a block diagram illustrating a variation of FIG. 1A. In this embodiment, a container 111 includes capabilities (or a portion of capabilities as shown in FIG. 2B) of the container tracking system 150. The container 111 can comprise a processor-based computing device capable of storing and executing instructions. The container 111 is in communication with the AIS system 140, using an AIS transponder, to receive vessel location information. Thus, the container 111 is self-sufficient in that the container 111 can make a determination as to which vessel it is located on. In one embodiment the result is sent to the container tracking system 150.

Figure 2A:
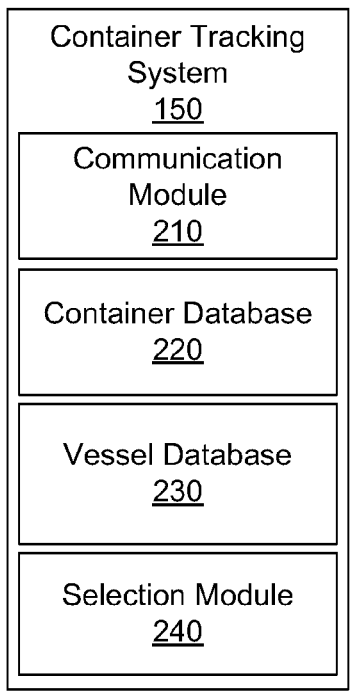
FIG. 2A is a block diagram illustrating further details of a container tracking system, according to one embodiment of the present invention.
Figure 2B:
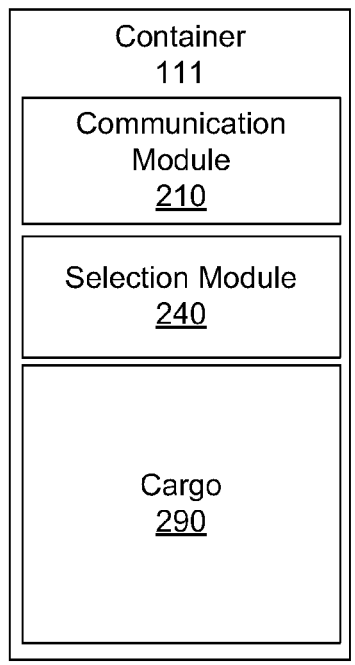
FIG. 2B is a block diagram illustrating a container with capabilities of the container tracking system, according to one embodiment of the present invention.

In particular, FIG. 2A shows one embodiment of the container tracking system 150 that comprises a communication module 210, a container database 220, a vessel database 230, and a selection module 240. The container database 220 is the primary information store for containers being tracked. However, in some embodiments, the vessel database 230 is optionally used to process container information grouped in a per-vessel format.

The communication module 210 comprises a combination of hardware and software such as a transponder, a satellite telephone, and/or an SMS parser. The communication module 210 provides input and output capabilities for communication with the container 110 and the AIS system 140. In one embodiment, the communication module 210 outputs reports to an administrator indicative of container status (e.g., a list of vessels along with a vessel on which they are loaded, an exception report for containers loaded on the wrong vessel, etc.).

The container database 220 stores a list of containers being tracked. For example, a manufacturer can track containers shipped out, or a warehouse can track containers being shipped in. The container database 220 can have a column identifying containers, a column identifying an assigned vessel for each container, and a status column indicating an actual vessel to which a container has been loaded. Additional information such as contents, source, destination, and estimated time of arrival can also be stored.

The vessel database 230 stores a list of vessels being tracked. A vessel with a group of assigned containers can be loaded into the database. The vessel database 230 can have a column identifying containers, and a column indicating whether confirmation has been made as to whether a container is loaded on the vessel.

The selection module 240 analyzes assigned containers and assigned vessels to determine whether a container is loaded on the correct vessel. The selection module 240 assesses the container database 220 and/or the vessel database 230 to retrieve information and store status information. The selection module 240 determines that the container 110 is loaded on vessel 120 using criteria such as container location, vessel location, container velocity, vessel velocity, vessel length, and mooring status. In one embodiment, the selection module 240 is active by initiating a query to the container 110 and/or the AIS system 140 to determine a container status. In another embodiment, the selection module 240 is passive by analyzing in response to new data.

FIG. 2B is a block diagram illustrating the container 111 which contains a portion of capabilities of the container tracking system 150, according to one embodiment of the present invention. The container 111 comprises a local version of the communication module 210, the selection module 240, and a cargo 290. Note that the container database 220 and the vessel database 230 are not necessary when the container 111 is only processing information about itself.

In one embodiment, the container 111 can provide localized instant results, while the container tracking system 150 provides additional or more accurate results.

Figure 3:
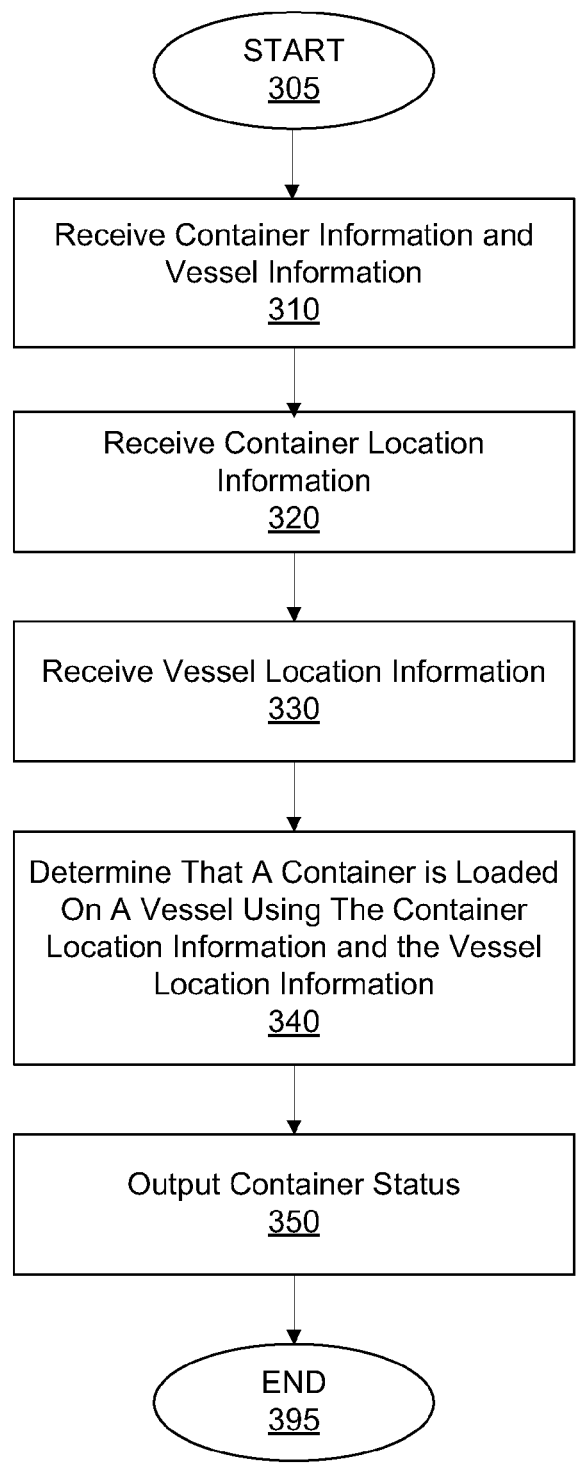
FIG. 3 is a flow chart illustrating a method for identifying a vessel a container is located on, according to one embodiment of the present invention.

FIG. 3 is a flow chart illustrating a method 300 of identifying a vessel that a container is loaded on, according to one embodiment of the present invention. The method 300 can be implemented in a system such as the identification system 100, and in particular, by the container tracking system 150. Particular implementations can have additional or fewer steps, and be performed in alternative sequences.

Container information is received 310. The container information can be sent over a suitable form of communication such as over a data network and stored on a nonvolatile memory such as a hard drive. The container information can be loaded prior to or during shipment. The container information can include a list of one or more containers to be loaded on vessels. The containers can be, for example, part of a shipment from a manufacturer, an order list from a warehouse, a specific product line, etc. In one embodiment, each container is associated with properties such as which vessel a container should be loaded on, contents, and the like.

Container location information is received 320. The container information can be transmitted directly from a container (e.g., the container 110) using, for example, transponder devices or telephone devices. In one embodiment, a container queries for a GPS location (e.g., from the GPS system 130) and periodically sends the results on its own accord. In another embodiment, the container location information can be requested. The container location information can include a field for an identification tag.

Vessel location information is received 330. Independent from the container information, the vessel location information can be received over a data network, or the like, from an AIS system (e.g., the AIS system 140). The vessel location information can be sent, in one embodiment, to a centralized container tracking system, and in another embodiment, to a localized container tracking system within the container itself. As with the container location information, a vessel queries for a GPS location and periodically sends results to an AIS system for purposes which may be unrelated to container tracking. The vessel location information can also update mooring status of a vessel, provide a vessel length and/or velocity, and other information that depends on a particular implementation.

A vessel upon which a container is loaded on is determined 340. By comparing container location information to vessel location information, a vessel upon which a container is loaded can be identified as described below in relation to FIG. 4.

Optionally, a variety of further processing can be performed once the vessel is identified. For example, the status of a container can be output 350 to a report or saved in a database. In another example, if a container is determined to be loaded on an incorrect vessel, an alarm can be triggered to a user, or a status can be transmitted back to a container.

Figure 4:
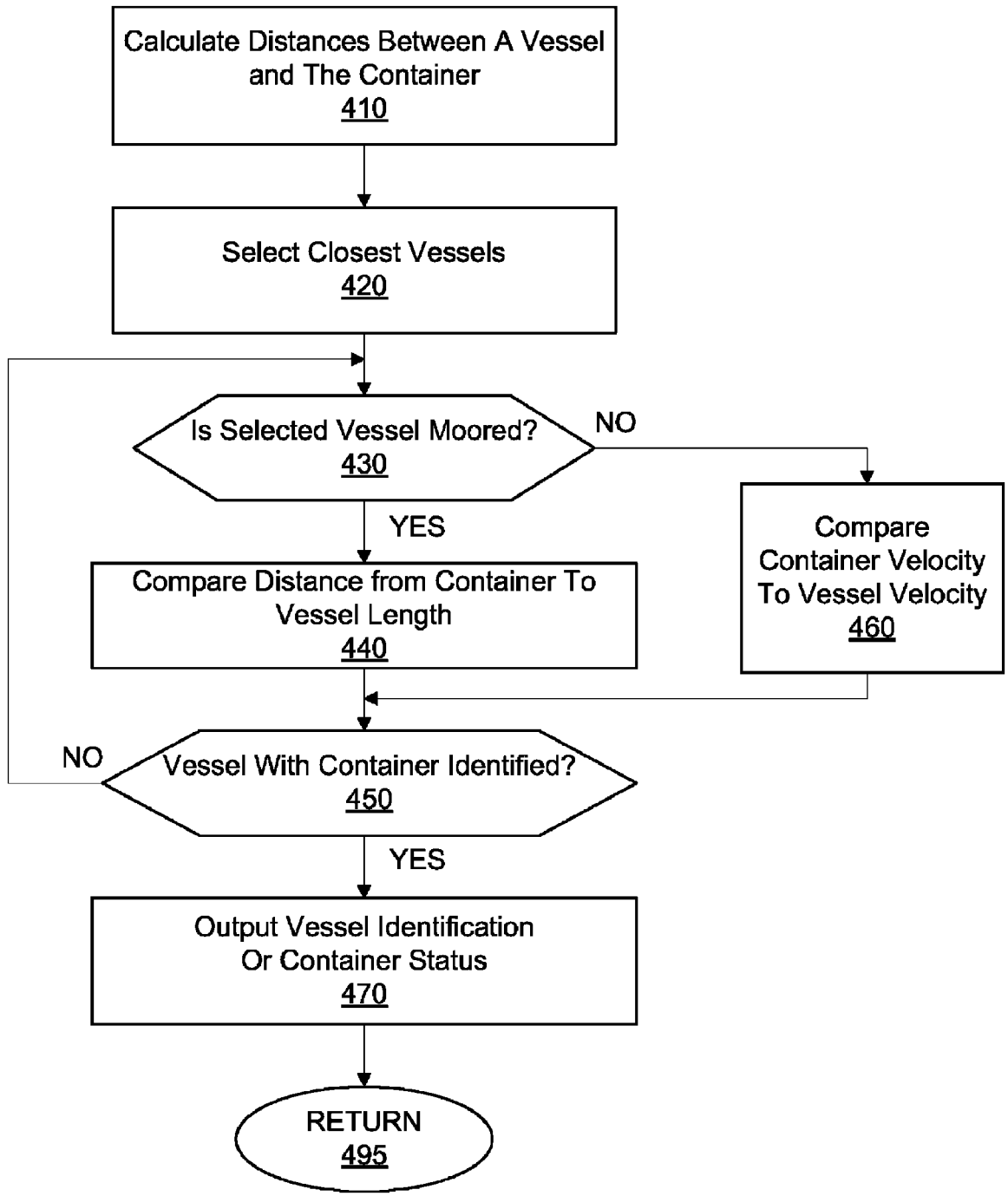
FIG. 4 is a flow chart illustrating further details of matching container location information with vessel information according to one embodiment of the present invention.

FIG. 4 is a more detailed flow chart illustrating the method 340 for matching container location information and vessel location information. In one embodiment, the method 340 is implemented by the selection module 240.

A distance between a container and a vessel is calculated 410 using, for example, the GPS coordinates of the container location information and the vessel location information. A port typically houses several vessels being loaded with containers and other freight. One or more of the closest vessels are selected 420 as candidate vessels. In one embodiment, a threshold distance is set as a default for elimination.

Various techniques are used to reduce more than one candidate vessels to a single candidate. One technique determines whether or not the vessel is moving, or unmoored. If the ship is unmoored 430, and a container is reportedly still being loaded, that vessel is eliminated from consideration. Another technique is used to analyze the distances. For the remaining moored vessels 430, the distances are compared to respective vessel lengths 440. In other words, if a ship length is 100 feet, the distance between a container and vessel cannot exceed 100 feet. On the other hand, there may be more than one vessel within 100 feet. If only one vessel fits the criteria, the vessel is identified 450. Otherwise, steps 430, 440, and 450 of the process can be repeated. Still another technique is to analyze the velocities of unmoored vessels 430. A velocity of the container can be compared to a velocity of the vessel 460. The identified vessel is output 470 and the process returns 495 to step 350 of FIG. 3 as described above.

In summary, independent location information received from a container and from a vessel is compared to determine whether the container is located on a correct vessel. Advantageously, misplaced or stolen freight can be quickly identified and remediated.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computers referred to herein may include a single processor or may be architectures employing multiple processor designs for increased computing capability.

What is claimed is:

1. A computer-implemented method for determining a vessel on which a container is loaded, the method comprising:
   receiving a container identification in a container tracking system;
   querying for a location of a container loaded on a vessel using a GPS (Geographic Positioning System) system;
   sending the container location information from a container to the container tracking system;
   querying for a location of the vessel using the GPS system;
   sending vessel location information from the vessel to an AIS (Automated Identification System) system;
   sending the vessel location information and a vessel length from the AIS system to the container tracking system; and
   determining that the container is loaded on the vessel responsive to using the container location information to the vessel location information to confirm that a distance between the container and the vessel is less than the vessel length.

2. A computer-implemented method for determining a vessel on which a container is loaded, the method comprising:
   receiving information identifying one or more containers;
   receiving container location information from a container tracking system, the container location information indicating a location of one or more containers;
   receiving vessel information from a vessel information system, the vessel information indicating an identity and a location for one or more vessels; and
   determining that a container is loaded on a vessel responsive to matching a container location of the container to a vessel location of the vessel
   calculating distances between the one or more vessels and the container;
   selecting a vessel if a distance between the vessel and the container is smaller than the vessel length;
   responsive to more than one vessel being selected, repeating the calculating and selecting steps until only one of the distances is smaller than the vessel length.

3. A method of claim 2, wherein the vessel information comprises a vessel status for the one or more vessels and wherein repeating the calculating comprises:
   responsive to a vessel status of one of the selected vessels changing from moored to unmoored, repeating the calculating and selected steps.

4. A method of claim 2, wherein determining that a container is loaded on the vessel comprises:
   determining a container velocity for the container and a vessel velocity for the identified vessel; and
   checking whether the container velocity is substantially equal to the vessel velocity.

5. A method of claim 4, comprising:
   receiving vessel speed and heading information as part of the vessel information; and
   determining the vessel velocity for the identified vessel based on the vessel speed and heading information.

6. The method of claim 2, further comprising
   receiving information identifying a vessel on which one or more containers are assigned;
   comparing the identified vessel to the loaded vessel; and
   outputting a result.

7. A computer program product for scrolling a document within a display area, comprising:
   a computer-readable medium; and
   computer program code, encoded on the medium, for:
      receiving information identifying one or more containers;
      receiving container location information from a container tracking system, the container location information indicating a location of one or more containers;
      receiving vessel information from a vessel information system, the vessel information indicating an identity and a location for one or more vessels; and
      determining that a container is loaded on a vessel responsive to using the container location information to the vessel location information to confirm that a distance between the container and the vessel is less than the vessel length.

8. A system to determine a vessel on which a container is loaded, comprising:
   a container database to store information identifying one or more containers;
   a communication module to receive container location information and vessel information, the container location information indicating a location of one or more containers, the vessel information indicating an identity and a location for one or more vessels;
   a selection module to determine that a container is loaded on a vessel responsive to matching a container location of the container to a vessel location of the vessel; and
   a determination that the container is located on the vessel responsive to using the container location information to confirm that a distance between the container and the vessel is less than the vessel length.

* * * * *